US010082674B2

(12) United States Patent
Mercer

(10) Patent No.: US 10,082,674 B2
(45) Date of Patent: Sep. 25, 2018

(54) VIEWER WITH ENHANCED DEPTH PERCEPTION

(71) Applicant: VISION ENGINEERING LIMITED, Surrey (GB)

(72) Inventor: Graham Peter Francis Mercer, Hampshire (GB)

(73) Assignee: VISION ENGINEERING LIMITED, Surrey (GB)

( * ) Notice: Subject to any disclaimer, the term of this patent is extended or adjusted under 35 U.S.C. 154(b) by 0 days.

(21) Appl. No.: 14/912,290

(22) PCT Filed: Aug. 15, 2014

(86) PCT No.: PCT/EP2014/067501
§ 371 (c)(1),
(2) Date: Feb. 16, 2016

(87) PCT Pub. No.: WO2015/022427
PCT Pub. Date: Feb. 19, 2015

(65) Prior Publication Data
US 2016/0202492 A1 Jul. 14, 2016

(30) Foreign Application Priority Data
Aug. 15, 2013 (GB) .................................. 1314686.5

(51) Int. Cl.
*G02B 27/22* (2018.01)
*G02B 17/00* (2006.01)
(Continued)

(52) U.S. Cl.
CPC ......... *G02B 27/2221* (2013.01); *G02B 17/08* (2013.01); *G02B 17/0856* (2013.01);
(Continued)

(58) Field of Classification Search
CPC .......................... G02B 27/2221; G02B 27/027; G02B 27/144; G02B 13/009; G02B 21/02;
(Continued)

(56) References Cited

U.S. PATENT DOCUMENTS 4,799,763 A 1/1989 Davis et al.
4,840,455 A 6/1989 Kempf
(Continued)

FOREIGN PATENT DOCUMENTS

JP 03-253183 11/1991
JP 06-324284 11/1994
(Continued)

OTHER PUBLICATIONS

International Search Report for corresponding Patent Application No. PCT/EP2014/067501 dated Nov. 26, 2014.
(Continued)

*Primary Examiner* — Jade R Chwasz
(74) *Attorney, Agent, or Firm* — Renner Otto Boisselle & Sklar, LLP

(57) ABSTRACT

A viewer for viewing an object under magnification, the viewer comprising: an objective lens for producing an image of an object located at an object plane and having a radial extent defined by an aperture stop; a partially-transmissive reflector for allowing transmission of light therethrough from the objective lens to a mirror arrangement and providing for reflection of light which is returned thereto from the mirror arrangement; a mirror arrangement which receives a light component from the partially-transmissive reflector, and is located such that a focussed image of the object is produced at the mirror arrangement and light received by the mirror arrangement is reflected back to the partially-transmissive reflector and relayed to produce an image of the object; a viewing lens arrangement for producing an optical
(Continued)

image of the object which is viewable by an observer at an exit pupil at a viewing plane; wherein the objective lens has a beam path angle (a) as defined by a distance from the object plane to the objective lens and a radial extent of the aperture stop; wherein the viewer has a viewing angle (β) as defined by a distance along an optical axis from the mirror arrangement to the viewing plane and a radial extent of the exit pupil at the viewing plane; wherein the viewer is configured such that a displacement ratio of the beam path angle (a) to the viewing angle (β) is at least 3:1, whereby the observer is provided with a greater change in depth perception of the object being observed relative to an extent of displacement of a head of the observer.

43 Claims, 3 Drawing Sheets

(51) Int. Cl.
    *G02B 27/14* (2006.01)
    *G02B 17/08* (2006.01)
    *G02B 27/02* (2006.01)
(52) U.S. Cl.
    CPC ......... *G02B 27/027* (2013.01); *G02B 27/144* (2013.01); *G02B 27/225* (2013.01)
(58) Field of Classification Search
    CPC .......... G02B 2027/0123; G02B 25/001; G02B 27/283; G03B 21/28; G03B 21/142; G03B 13/32; G03B 21/145; G03B 21/2066; G03B 21/00
    USPC ....... 359/466, 471, 473, 475, 477, 479, 656, 359/660, 661, 676, 677, 694, 708–712, 359/726, 727, 728, 730, 732
    See application file for complete search history.

(56) References Cited

U.S. PATENT DOCUMENTS

| | | |
|---|---|---|
| 5,477,385 A | 12/1995 | Freeman |
| 6,608,720 B1 | 8/2003 | Freeman |
| 2005/0057788 A1 | 3/2005 | Cobb et al. |
| 2012/0200905 A1 | 8/2012 | Paulus et al. |

FOREIGN PATENT DOCUMENTS

| | | |
|---|---|---|
| JP | 2009/151065 | 7/2009 |
| KR | 10/0634287 B | 10/2006 |
| WO | 94/06048 A1 | 3/1994 |

OTHER PUBLICATIONS

Search Report for corresponding United Kingdom Patent Application No. GB 1314686.5 dated Dec. 18, 2013.

VIEWER WITH ENHANCED DEPTH PERCEPTION

This application is a national phase of International Application No. PCT/EP2014/067501 filed Aug. 15, 2014 and published in the English language.

The present invention relates to a viewer for viewing an object under magnification, which provides the observer with enhanced depth perception.

Various magnifying apparatus exist for viewing objects, including stereoscopic magnifying apparatus as disclosed in the applicant's earlier U.S. Pat. No. 5,477,385.

The present inventor has, however, recognized that it is possible to provide an observer with significantly enhanced depth perception, in mono or stereo viewing apparatus, by configuring the apparatus to employ effects of focus, parallax and superimposition, which can all contribute to the interpretation of the observer to depth perception.

In one aspect the present invention provides a viewer for viewing an object under magnification, the viewer comprising: an objective lens for producing an image of an object located at an object plane and having a radial extent defined by an aperture stop; a partially-transmissive reflector for allowing transmission of light therethrough from the objective lens to a mirror arrangement and providing for reflection of light which is returned thereto from the mirror arrangement; a mirror arrangement which receives a light component from the partially-transmissive reflector, and is located such that a focussed image of the object is produced at the mirror arrangement and light received by the mirror arrangement is reflected back to the partially-transmissive reflector and relayed to produce an image of the object; a viewing lens arrangement for producing an optical image of the object which is viewable by an observer at an exit pupil at a viewing plane; wherein the objective lens has a beam path angle ($\alpha$) as defined by a distance from the object plane to the objective lens and a radial extent of the aperture stop; wherein the viewer has a viewing angle ($\beta$) as defined by a distance along an optical axis from the mirror arrangement to the viewing plane and a radial extent of the exit pupil at the viewing plane; wherein the viewer is configured such that a displacement ratio of the beam path angle ($\alpha$) to the viewing angle ($\beta$) is at least 3:1, whereby the observer is provided with a greater change in depth perception of the object being observed relative to an extent of displacement of a head of the observer.

In one embodiment the displacement ratio of the beam path angle ($\alpha$) to the viewing angle ($\beta$) is at least 4:1.

In another embodiment the displacement ratio of the beam path angle ($\alpha$) to the viewing angle ($\beta$) is at least 5:1.

In a further embodiment the displacement ratio of the beam path angle ($\alpha$) to the viewing angle ($\beta$) is at least 6:1.

In a still further embodiment the displacement ratio of the beam path angle ($\alpha$) to the viewing angle ($\beta$) is at least 8:1.

In a yet further embodiment the displacement ratio of the beam path angle ($\alpha$) to the viewing angle ($\beta$) is at least 10:1.

In a still yet further the displacement ratio of the beam path angle ($\alpha$) to the viewing angle ($\beta$) is at least 12:1.

In yet still another embodiment the displacement ratio of the beam path angle ($\alpha$) to the viewing angle ($\beta$) is at least 13:1.

In one embodiment the beam path angle ($\alpha$) is at least 6 degrees.

In another embodiment the beam path angle ($\alpha$) is at least 8 degrees.

In still another embodiment the beam path angle ($\alpha$) is at least 9 degrees.

In yet another embodiment the beam path angle ($\alpha$) is at least 10 degrees.

In yet still another embodiment the beam path angle ($\alpha$) is at least 12 degrees.

In a yet further embodiment the beam path angle ($\alpha$) is at least 13 degrees.

In one embodiment the viewing angle ($\beta$) is not more than 2 degrees.

In another embodiment the viewing angle ($\beta$) is not more than 1.5 degrees.

In one embodiment the light component received by the mirror arrangement passes through the partially-transmissive reflector.

In one embodiment the light received from the mirror arrangement and relayed by the partially-transmissive reflector is reflected by the partially-transmissive reflector.

In one embodiment the objective lens is located at a distance of less than 120 mm along the optical axis from the object plane.

In another embodiment the objective lens is located at a distance of less than 100 mm along the optical axis from the object plane.

In a further embodiment the objective lens is located at a distance of less than 80 mm along the optical axis from the object plane.

In a still further embodiment the objective lens is located at a distance of less than 60 mm along the optical axis from the object plane.

In one embodiment the aperture stop has an aperture diameter of at least 30 mm.

In another embodiment the aperture stop has an aperture diameter of at least 35 mm.

In a further embodiment the aperture stop has an aperture diameter of at least 40 mm.

In one embodiment the partially-transmissive reflector comprises a semi-transmissive reflector.

In one embodiment the partially-transmissive reflector comprises a partially-transmissive mirror, optionally a half-silvered planar mirror.

In one embodiment an optical center of the viewer as provided by the optical axis at the partially-transmissive reflector is located at a distance of at least 150 mm along the optical axis from the viewing plane.

In another embodiment an optical center of the viewer as provided by the optical axis at the partially-transmissive reflector is located at a distance of at least 180 mm along the optical axis from the viewing plane.

In a further embodiment an optical center of the viewer as provided by the optical axis at the partially-transmissive reflector is located at a distance of at least 200 mm along the optical axis from the viewing plane.

In a still further embodiment an optical center of the viewer as provided by the optical axis at the partially-transmissive reflector is located at a distance of at least 250 mm along the optical axis from the viewing plane.

In one embodiment the exit pupil at the viewing plane has a diameter of not more than 30 mm.

In another embodiment the exit pupil at the viewing plane has a diameter of not more than 25 mm.

In one embodiment the viewer further comprises: an illuminator which includes a plurality of light sources for illuminating the object which are offset from the optical axis of the viewer.

In one embodiment the light sources comprise point light sources, optionally LEDs, which are arranged around the optical axis.

In one embodiment the viewer further comprises: a zoom objective which comprises the objective lens and a plurality of additional lenses.

In one embodiment the partially-transmissive reflector is a beam splitter for splitting light from the objective lens to have first and second light components, the first-mentioned mirror arrangement receiving the first light component from the beam splitter, and further comprising: a second mirror arrangement which receives the second light component from the beam splitter and is located such that a focussed second image of the object is produced at the second mirror arrangement and light received by the second mirror arrangement is reflected back to the beam splitter and relayed to produce an image of the object; wherein the mirror arrangements are oriented such that pupil centres of the exit pupils as relayed by the respective mirror arrangements are offset, corresponding to an interpupillary spacing of the observer, and the viewing lens arrangement relays both of the exit pupils, thereby providing that the exit pupils from the respective mirror arrangements are relayed to respective ones of the eyes of the observer and providing different stereo parallax views of the object to each eye of the observer.

In one embodiment the light component received by the second mirror arrangement is reflected the beam splitter.

In one embodiment the light received from the second mirror arrangement and relayed by the beam splitter passes through the beam splitter.

In one embodiment any or each mirror arrangement comprises a mirror and a spherical lens at the surface of the mirror.

In one embodiment the mirror comprises a planar mirror.

In another embodiment the mirror comprises an aspherical mirror.

In another embodiment any or each mirror arrangement comprises a concave mirror.

Preferred embodiments of the present invention will now be described hereinbelow by way of example only with reference to the accompanying drawings, in which.

Figure 1:
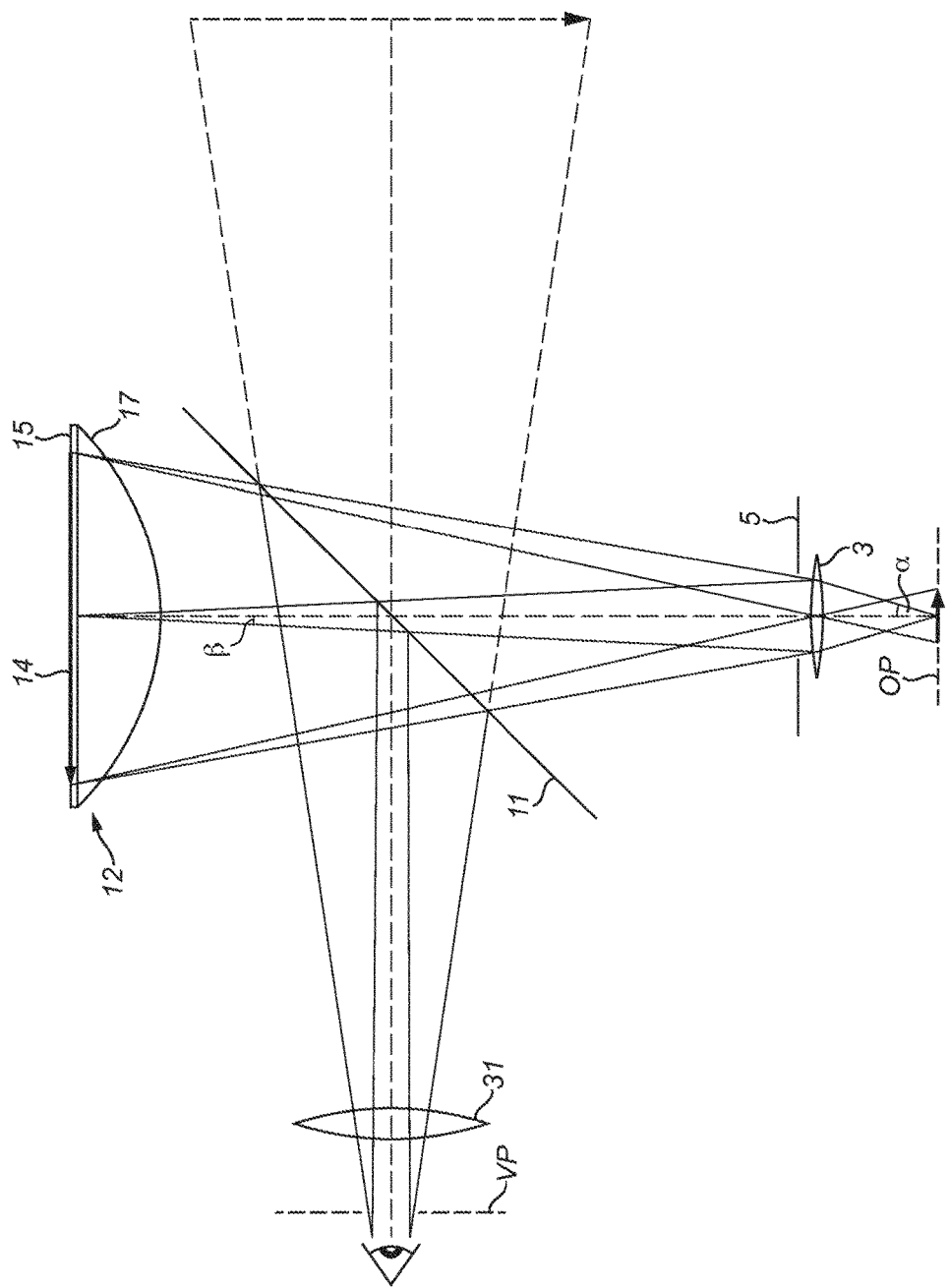
FIG. 1 illustrates a viewer in accordance with a first embodiment of the present invention.

The viewer comprises an objective lens 3 for producing an image of an object located at an object plane OP, in this embodiment as defined by an aperture stop 5.

In this embodiment the objective lens 3 is located at a distance of 100 mm along the optical axis from the object plane OP, and the aperture stop 5 has an aperture diameter of 35 mm.

The viewer further comprises a semi-transparent mirror 11 for allowing transmission of light therethrough from the objective lens 3 to a mirror arrangement 12 and providing for reflection of light which is returned thereto from the mirror arrangement 12. In this embodiment the semi-transparent mirror 11 comprises a half-silvered planar mirror.

The viewer further comprises a mirror arrangement 12 which receives a light component from the semi-transparent mirror 11, in this embodiment passing through the semi-transparent mirror 11, and is located such that a focussed image 14 of the object is produced at the mirror arrangement 12 and light received by the mirror arrangement 12 is reflected back to the semi-transparent mirror 11 and relayed, in this embodiment as reflected by the semi-transparent mirror 11, to produce an image of the aperture stop 5 of the objective lens 3.

In this embodiment the mirror arrangement 12 comprises a planar or aspherical mirror 15 and a spherical lens 17 at the surface of the mirror 15.

In an alternative embodiment the mirror arrangement 12 could comprise a concave mirror.

The viewer further comprises a viewing lens arrangement 31 for relaying the exit pupil to a viewing plane VP, such as to be viewable by an eye of an observer.

In this embodiment the mirror arrangement 12 is configured in combination with the viewing lens 31 to produce an image of the aperture 5 of the objective lens 3 as an exit pupil at an eye of an observer.

In this embodiment the optical center of the viewer, as represented by the optical axis at the semi-transparent mirror 11, is located at a distance of 300 mm along the optical axis from the viewing plane VP, with the distance to the apparent image being 500 mm, and the exit pupil at the viewing plane VP has a diameter of 25 mm.

With the arrangement, a very small change in the viewing angle β of the observer relative to the optical center of the viewer causes a very significant shift in the part of the image 14 at the mirror arrangement 12 which is being relayed to the observer, which is represented by the beam path angle α from the object to the objective lens 3.

In this embodiment the maximum viewing angle β is 1.43 degrees, which corresponds to a beam path angle α of 9.93 degrees, such that the displacement ratio of the beam path angle α to the viewing angle β is 6.94:1.

In preferred embodiments the displacement ratio of the beam path angle α to the viewing angle β is at least 3:1, optionally at least 4:1, more optionally at least 5:1, still more optionally at least 6:1.

Accordingly, the observer is provided with a very pronounced depth perception from a very small displacement of the head of the observer, providing the observer with a marked perception of depth without losing focus on the part of the image being observed, as could happen if a large displacement of the head were required.

Figure 2:
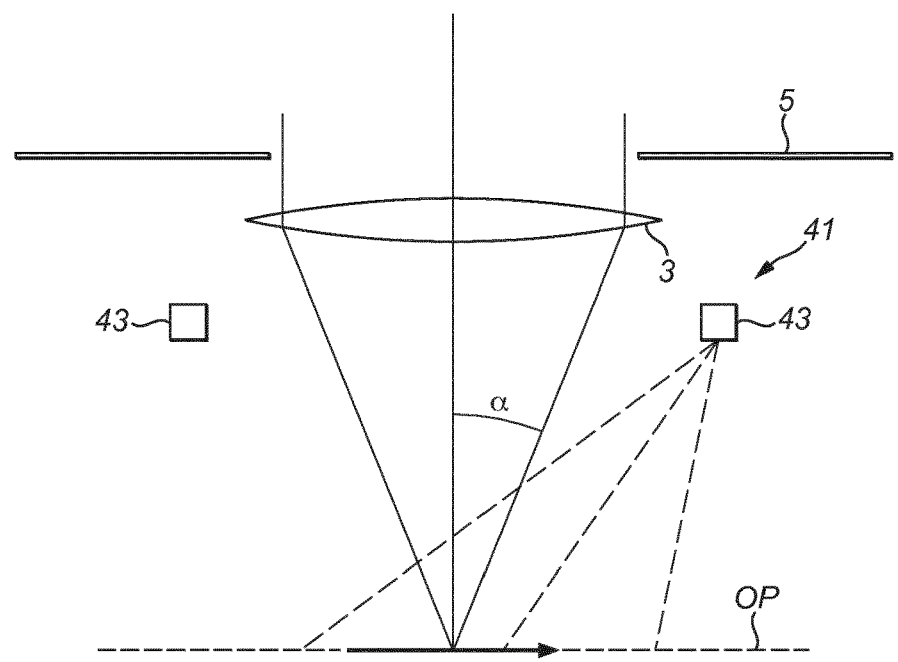
FIG. 2 illustrates a viewer in accordance with a second embodiment of the present invention.

FIG. 2 illustrates a viewer in accordance with a second embodiment of the present invention.

The viewer of this embodiment is very similar to the viewer of the first-described embodiment. In order to avoid unnecessary duplication of description, only the differences will be described in detail, with like parts being designated by like reference signs.

The viewer of this embodiment differs from that of the first-described embodiment in comprising an illuminator 41 which includes a plurality of light sources 43 for illuminating the object which are offset from the optical axis of the viewer.

In this embodiment the light sources 43 comprise point light sources, here LEDs, which are arranged around the optical axis. In this embodiment the light sources 43 are disposed substantially on an annulus.

With this arrangement, the depth perception as achieved by the structural configuration of the optical components of the viewer is enhanced, as the off-axis illumination tends to accentuate any edge features or facets at the surface of the object, which promotes the depth perception as the observer moves his or her head, with edge features or facets being highlighted by a change in reflectivity.

Figure 3:
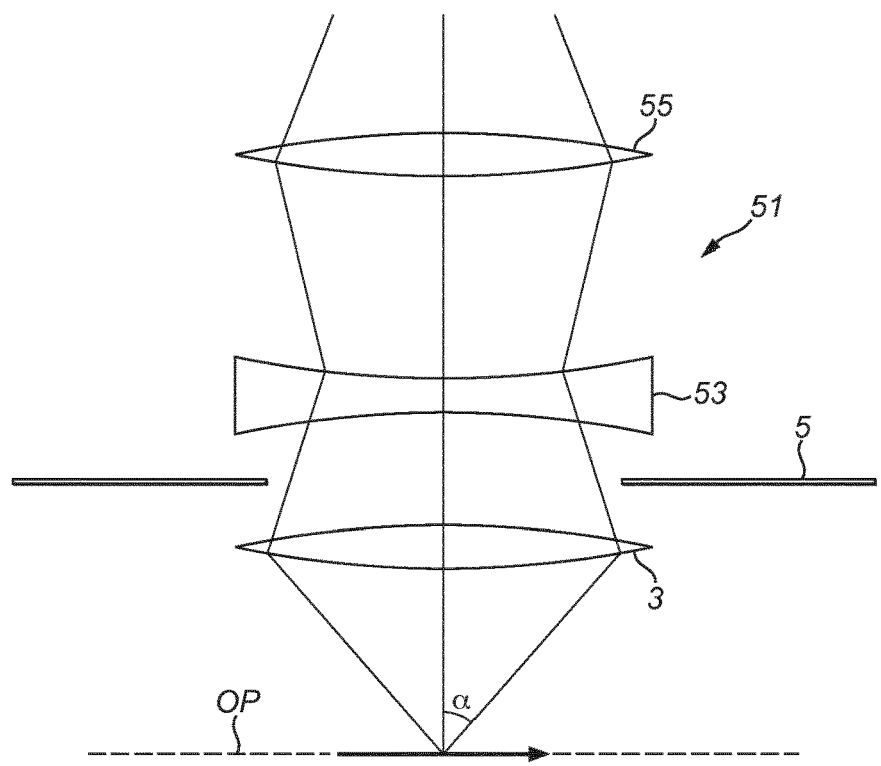
FIG. 3 illustrates a viewer in accordance with a third embodiment of the present invention.

FIG. 3 illustrates a viewer in accordance with a third embodiment of the present invention.

The viewer of this embodiment is very similar to the viewer of the first-described embodiment. In order to avoid unnecessary duplication of description, only the differences will be described in detail, with like parts being designated by like reference signs.

The viewer of this embodiment differs from the viewer of the first-described embodiment in that the viewer comprises a zoom objective 51, which comprises the objective lens 3 and a plurality of additional lenses 53, 55, and in that the objective lens 3 is more closely located to the object plane OP, in this embodiment located at a distance of 50 mm along the optical axis from the object plane OP.

With this arrangement, further enhanced depth perception is achieved as the beam path angle α is 19.86 degrees, whereby the displacement ratio of the beam path angle α to the viewing angle β is 13.88:1.

In preferred embodiments the displacement ratio of the beam path angle α to the viewing angle β is at least 8:1, optionally at least 10:1, more optionally at least 12:1, still more optionally at least 13:1.

Figure 4:
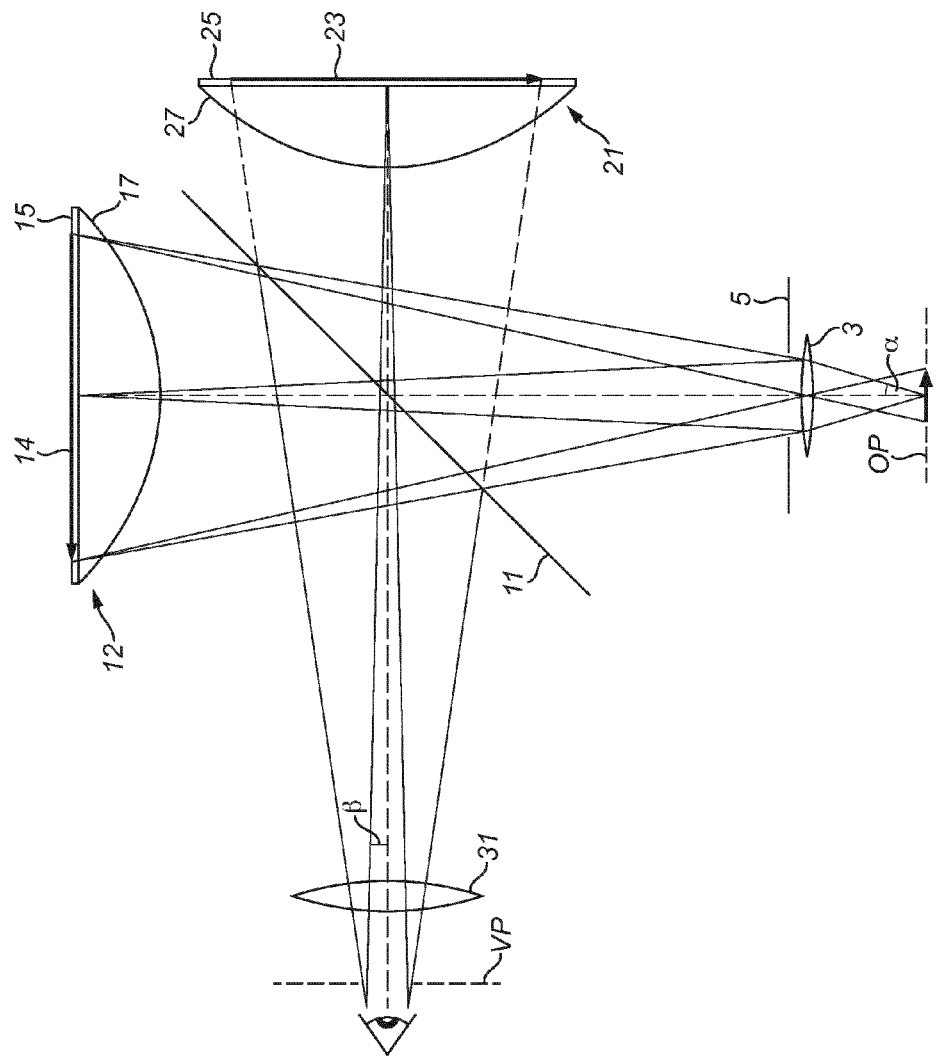
FIG. 4 illustrates a viewer in accordance with a fourth embodiment of the present invention.

FIG. 4 illustrates a viewer in accordance with a fourth embodiment of the present invention.

The viewer of this embodiment differs from the viewer of the first-described embodiment in being a stereoscopic viewer, whereby expanded exit pupils are provided to each of the eyes of the user in order to further enhance depth perception. In order to avoid unnecessary duplication of description, only the differences will be described in detail, with like parts being designated by like reference signs.

In this embodiment the semi-transparent mirror 11 is a beam splitter for splitting light from the objective lens 3 to have first and second light components.

In this embodiment the first mirror arrangement 12 receives the first light component from the beam splitter 11, here passing through the beam splitter 11, and is located such that a focussed first image 14 of the object is produced at the first mirror arrangement 12 and light received by the first mirror arrangement 12 is reflected back to the beam splitter 11 and relayed, here as reflected by the beam splitter 11, to produce an image of the aperture stop 5 of the objective lens 3.

In this embodiment the viewer further comprises a second mirror arrangement 21 which receives the second light component from the beam splitter 11, here as reflected by the beam splitter 11, and is located such that a focussed second image 23 of the object is produced at the second mirror arrangement 21 and light received by the second mirror arrangement 21 is reflected back to the beam splitter 11 and relayed, here by passing through the beam splitter 11, to produce an image of the aperture stop 5 of the objective lens 3.

In this embodiment the second mirror arrangement 21 comprises a planar or aspherical mirror 25 and a spherical lens 27 at the surface of the mirror 25.

In an alternative embodiment the second mirror arrangement 21 could comprise a concave mirror.

In this embodiment the mirror arrangements 12, 21 are oriented such that the pupil centres of the exit pupils as relayed by the respective mirror arrangements 12, 21 are offset, corresponding to the interpupillary spacing of the observer, thereby providing that the exit pupils from the respective mirror arrangements 12, 21 are relayed to respective ones of the eyes of the observer and thereby providing different stereo parallax views of the object to each eye.

In this embodiment the viewing lens arrangement 31 relays both of the exit pupils to the viewing plane VP, such as to be viewable by the respective eyes of the observer.

With the arrangement, exit pupils are provided to each of the eyes and the observer is provided with the perception of a stereoscopic image.

Finally, it will be understood that the present invention has been described in its preferred embodiments and can be modified in many different ways without departing from the scope of the invention as defined by the appended claims.

In one modification the viewer could further comprise an image inverter, typically between the objective lens 3 and the semi-transparent reflector 11, for re-orienting the image of the object as provided by the objective lens 3. In one embodiment the image inverter could comprise a double Porro prism.

The invention claimed is:

1. A viewer for viewing an object under magnification, the viewer comprising:
   an objective lens for producing an image of an object located at an object plane and having a radial extent defined by an aperture stop;
   a partially-transmissive reflector for allowing transmission of light therethrough from the objective lens to a mirror arrangement and providing for reflection of light which is returned thereto from the mirror arrangement;
   a mirror arrangement which receives a light component from the partially-transmissive reflector, and is located such that a focussed image of the object is produced at the mirror arrangement and light received by the mirror arrangement is reflected back to the partially-transmissive reflector and relayed to produce an image of the object;
   a viewing lens arrangement for producing an optical image of the object which is viewable by an observer at an exit pupil at a viewing plane;
   wherein the objective lens has a beam path angle (α) which is an angle subtended from a point where an optical axis of the objective lens meets the object plane and defined by a distance along the optical axis from the object plane to the objective lens and a radial extent of the aperture stop;
   wherein the viewer has a viewing angle (β) which is an angle subtended from a point on the mirror arrangement at an optical axis of the mirror arrangement and defined by a distance along the optical axis from the mirror arrangement to the viewing plane and a radial extent of the exit pupil at the viewing plane;
   wherein the viewer is configured such that a displacement ratio of the beam path angle (α) to the viewing angle (β) is at least 3:1.

2. The viewer of claim 1, wherein the displacement ratio of the beam path angle (α) to the viewing angle (β) is at least 4:1.

3. The viewer of claim 1, wherein the displacement ratio of the beam path angle (α) to the viewing angle (β) is at least 5:1.

4. The viewer of claim 1, wherein the displacement ratio of the beam path angle (α) to the viewing angle (β) is at least 6:1.

5. The viewer of claim 1, wherein the displacement ratio of the beam path angle (α) to the viewing angle (β) is at least 8:1.

6. The viewer of claim 1, wherein the displacement ratio of the beam path angle (α) to the viewing angle (β) is at least 10:1.

7. The viewer of claim 1, wherein the displacement ratio of the beam path angle (α) to the viewing angle (β) is at least 12:1.

8. The viewer of claim 1, wherein the displacement ratio of the beam path angle (α) to the viewing angle (β) is at least 13:1.

9. The viewer of claim 1, wherein the beam path angle (α) is at least 6 degrees.

10. The viewer of claim 1, wherein the beam path angle (α) is at least 8 degrees.

11. The viewer of claim 1, wherein the beam path angle (α) is at least 9 degrees.

12. (Previously Presented The viewer of claim 1, wherein the beam path angle (α) is at least 10 degrees.

13. The viewer of claim 1, wherein the beam path angle (α) is at least 12 degrees.

14. The viewer of claim 1, wherein the beam path angle (α) is at least 13 degrees.

15. The viewer of claim 1, wherein the viewing angle (β) is not more than 2 degrees.

16. The viewer of claim 1, wherein the viewing angle (β) is not more than 1.5 degrees.

17. The viewer of claim 1, wherein the light component received by the mirror arrangement passes through the partially-transmissive reflector.

18. The viewer of claim 1, wherein the light received from the mirror arrangement and relayed by the partially-transmissive reflector is reflected by the partially-transmissive reflector.

19. The viewer of claim 1, wherein the objective lens is located at a distance of less than 120 mm along the optical axis from the object plane.

20. The viewer of claim 1, wherein the objective lens is located at a distance of less than 100 mm along the optical axis from the object plane.

21. The viewer of claim 1, wherein the objective lens is located at a distance of less than 80 mm along the optical axis from the object plane.

22. The viewer of claim 1, wherein the objective lens is located at a distance of less than 60 mm along the optical axis from the object plane.

23. The viewer of claim 1, wherein the aperture stop has an aperture diameter of at least 30 mm.

24. The viewer of claim 1, wherein the aperture stop has an aperture diameter of at least 35 mm.

25. The viewer of claim 1, wherein the aperture stop has an aperture diameter of at least 40 mm.

26. The viewer of claim 1, wherein the partially-transmissive reflector comprises a semi-transmissive reflector.

27. The viewer of claim 26, wherein the partially-transmissive reflector comprises a partially-transmissive mirror or a half-silvered planar mirror.

28. The viewer of claim 1, wherein an optical center of the viewer as provided by the optical axis at the partially-transmissive reflector is located at a distance of at least 150 mm along the optical axis from the viewing plane.

29. The viewer of claim 1, wherein an optical center of the viewer as provided by the optical axis at the partially-transmissive reflector is located at a distance of at least 180 mm along the optical axis from the viewing plane.

30. The viewer of claim 1, wherein an optical center of the viewer as provided by the optical axis at the partially-transmissive reflector is located at a distance of at least 200 mm along the optical axis from the viewing plane.

31. The viewer of claim 1, wherein an optical center of the viewer as provided by the optical axis at the partially-transmissive reflector is located at a distance of at least 250 mm along the optical axis from the viewing plane.

32. The viewer of claim 1, wherein the exit pupil at the viewing plane has a diameter of not more than 30 mm.

33. The viewer of claim 1, wherein the exit pupil at the viewing plane has a diameter of not more than 25 mm.

34. The viewer of claim 1, further comprising:
an illuminator which includes a plurality of light sources for illuminating the object which are offset from the optical axis of the viewer.

35. The viewer of claim 34, wherein the light sources comprise point light sources or LEDs, which are arranged around the optical axis.

36. The viewer of claim 1, further comprising:
a zoom objective which comprises the objective lens and a plurality of additional lenses.

37. The viewer of claim 1, wherein the partially-transmissive reflector is a beam splitter for splitting light from the objective lens to have first and second light components, the first-mentioned mirror arrangement receiving the first light component from the beam splitter, and further comprising:
a second mirror arrangement which receives the second light component from the beam splitter and is located such that a focussed second image of the object is produced at the second mirror arrangement and light received by the second mirror arrangement is reflected back to the beam splitter and relayed to produce an image of the object;
wherein the mirror arrangements are oriented such that pupil centers of the exit pupils as relayed by the respective mirror arrangements are offset, corresponding to an interpupillary spacing of the observer, and the viewing lens arrangement relays both of the exit pupils, thereby providing that the exit pupils from the respective mirror arrangements are relayed to respective ones of the eyes of the observer and providing different stereo parallax views of the object to each eye of the observer.

38. The viewer of claim 37, wherein the light component received by the second mirror arrangement is reflected by the beam splitter.

39. The viewer of claim 37, wherein the light received from the second mirror arrangement and relayed by the beam splitter passes through the beam splitter.

40. The viewer of claim 1, wherein any or each mirror arrangement comprises a mirror and a spherical lens at the surface of the mirror.

41. The viewer of claim 40, wherein the mirror comprises a planar mirror.

42. The viewer of claim 40, wherein the mirror comprises an aspherical mirror.

43. The viewer of claim 1, wherein any or each mirror arrangement comprises a concave mirror.

* * * * *